Dec. 29, 1931.                H. C. EDDY                1,838,909
APPARATUS FOR DEHYDRATING PETROLEUM OIL
Original Filed Aug. 7, 1926
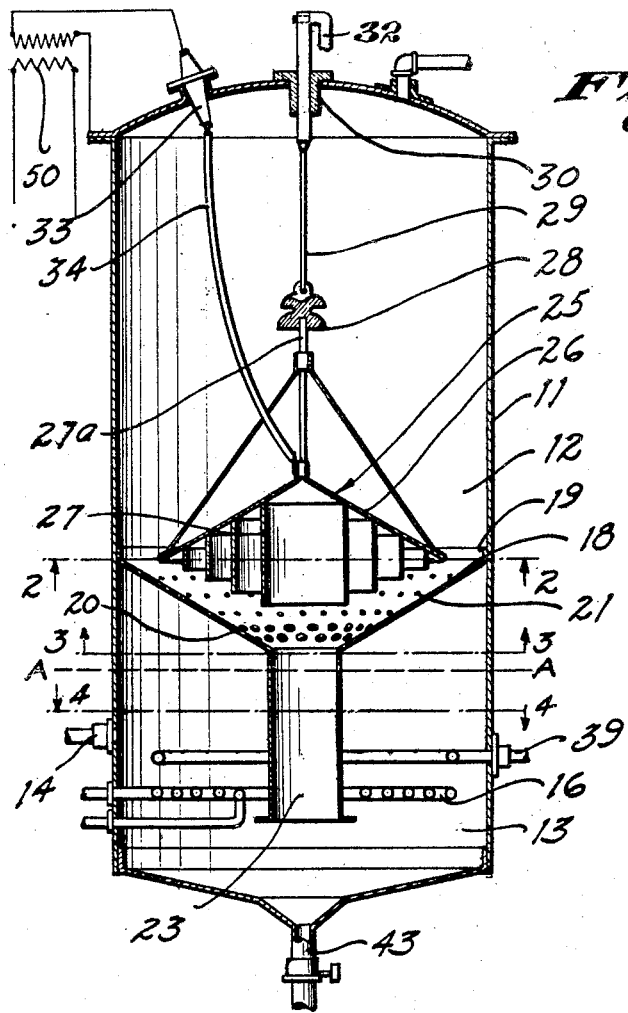
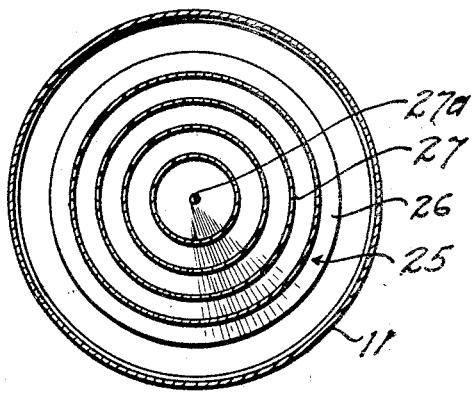
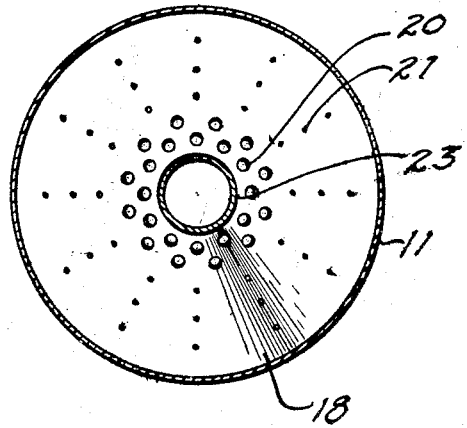
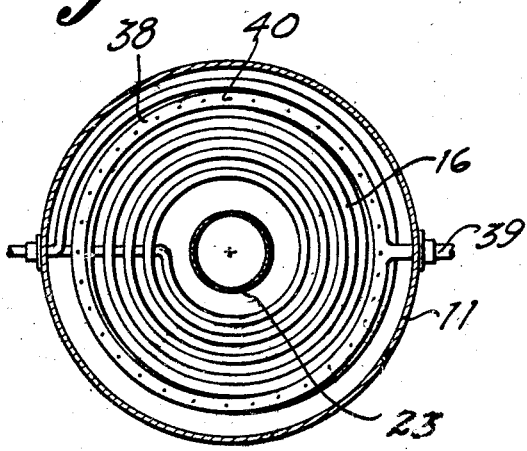
INVENTOR:
HAROLD C. EDDY.
BY
ATTORNEY.

Patented Dec. 29, 1931

1,838,909

UNITED STATES PATENT OFFICE

HAROLD C. EDDY, OF LOS ANGELES, CALIFORNIA, ASSIGNOR TO PETROLEUM RECTIFYING COMPANY OF CALIFORNIA, OF LOS ANGELES, CALIFORNIA, A CORPORATION OF CALIFORNIA

APPARATUS FOR DEHYDRATING PETROLEUM OIL

Application filed August 7, 1926, Serial No. 127,951. Renewed January 28, 1931.

This invention relates to an apparatus for dehydrating emulsions and particularly emulsions consisting of petroleum and water. Petroleum emulsion as it is derived from the well sometimes carries particles of trapped water which will not settle out by gravity if the emulsion is allowed to stand. These emulsions of oil and water may contain as much as sixty per cent of water, which water content must be reduced to about two per cent to be salable as what is known as "pipe line oil."

It is common practice to separate the water and oil by an electrical dehydrating process which is accomplished by introducing the emulsion into a tank which is provided with a pair of electrodes between which an electric field is established. When the emulsion passes into the electric field the particles of water are coalesced into globules which are large enough to separate from the oil by gravity.

These emulsions may also contain mud and sand which impair the operation of the electrical dehydrator, sometimes greatly reducing its efficiency.

It is an object of this invention to provide a method and apparatus for preliminarily removing the mud and sand from the emulsion and thereafter electrically separating the water phase from the oil of the emulsion.

In my invention I provide a tank having a body of washing medium formed in the lower portion thereof. The emulsion is introduced into the tank below the level of the body of washing medium so that it must pass upward therethrough. This body of washing medium washes the emulsion, removing the mud and sand therefrom.

It is an object of this invention to provide a method and apparatus of the character mentioned in which the water separated from the oil is delivered to the body of washing medium in the tank.

Other objects and advantages of my invention will be emphasized in the following description.

A preferred form of my invention is illustrated in the accompanying drawings which are diagrammatic and in which Fig. 1 is a vertical section through the invention.

Fig. 2 is a section taken on the line 2—2 of Fig. 1.

Fig. 3 is a section taken on the line 3—3 of Fig. 1.

Fig. 4 is a section taken on the line 4—4 of Fig. 1.

Referring in detail to the drawings, 11 is a tank providing a treating chamber 12 in the upper end thereof. The lower part of the tank 11 provides a settling chamber which is partially filled with a body of washing medium in the form of water, indicated by the numeral 13. I prefer to keep the water at about one-tenth normal alkaline solution (caustic soda) in order to reduce the surface tension of the emulsion particles which are passed therethrough, as will be described later. The body of water 13 may be added to or subtracted from by means of a pipe 14 which is connected to the side of the tank 11, or additional concentrated caustic solution may be added thereby. Near the lower end of the tank 11 is a coil of pipe 16 through which steam may be passed for the purpose of heating the washing medium 13.

The numeral 18 represents a grounded electrode which is in the form of an inverted frusto cone and which forms a boundary between the treating and settling chambers. The extremity of the grounded electrode 18 is provided with a flange 19 which is in tight contact with the tank 11. Near the center and lower part of the grounded electrode 18 is a plurality of openings 20 through which emulsion may pass. Also formed in the grounded electrode 18 is a multiplicity of small gas passages 21 through which gas separating from the emulsion may pass. This prevents the forming of a body of gas below the grounded electrode 18. It should be noted that the grounded electrode 18 is placed so that it is entirely above the level of the body of washing medium 13, this level being indicated by the line A—A in Fig. 1.

Extending downward from the central part of the grounded electrode 18 is a return tube 23, this return tube 23 being in open communication with the space above the grounded electrode 18. The lower end of the return tube 23 extends well below the level A—A of the body of washing medium 13 and below the heating coil 16 so as to prevent the heated fluid from appreciably retarding the downward return flow through the return tube.

Supported immediately above the grounded electrode 18 is a live electrode 25, these electrodes cooperating in defining a treating space. The live electrode 25 has a conical member 26, from which a plurality of concentric rings 27 extend. The live electrode 25 has a rod 27ª extending from the upper part thereof which is secured to an insulator 28. The insulator 28 is supported by a rod 29 which extends through a bearing 30 to the exterior of the tank 11. The upper end of the rod 29 is attached to a crank 32, by means of which the live electrode 25 may be raised and lowered, either continuously or intermittently, by suitable mechanism not shown. Supported by and passing through the top of the tank 11 is an insulator bushing 33, having a central conductor to which is connected a conductor 34 which is also connected to the live electrode 25.

Emulsion is introduced into the tank 11 by means of an emulsion inlet ring 38. The emulsion inlet ring 38 is situated in the tank 11 below the level A—A of the body of washing medium 13, but slightly above the lower end of the return tube 23 so that the matter separated from the emulsion is returned to the body of washing fluid at a point below the point of introduction of the emulsion and entirely out of contact with the incoming emulsion, thus preventing any tendency for the introduced emulsion creating an upward flow in the return tube or appreciably retarding the downward flow therethrough. This is shown in Fig. 1. The emulsion is delivered to the emulsion inlet ring 38 by a pipe 39 which is extended through the wall of the tank 11, this pipe 39 also supporting the emulsion inlet ring 38. Spray openings 40 are formed in the emulsion inlet ring 38 so that emulsion will be passed into the body of washing medium in small streams so that an effective washing may be obtained. The heating coil 16 also acts as a circulating means and assists the rise of the emulsion into the treating space. Oil which has been dehydrated is withdrawn from the upper end of the tank 11 by means of a pipe 42.

The operation of the invention is substantially as follows:

The alkaline solution, which is the body of washing medium 13 at the lower end of the tank 11, is heated to a suitable temperature by means of the heating coil 16. Emulsion to be treated is introduced into the body 13 in small streams or sprays passing upward through the body. The emulsion is thoroughly washed as it passes upward through the body 13 and practically all of the mud and sand is separated therefrom, this mud and sand settling at the lower end of the tank 11 and being withdrawn therefrom through a pipe 43. The emulsion which has been freed of mud and sand passes through the openings 20 into the space between the live and grounded electrodes 25 and 18. A source of electrical potential such as a transformer 50 is used to impress a potential between the electrodes 18 and 25. The particles of water in the emulsion are affected by this field and coalesce into globules which tend to settle out of the field.

In the form of the invention shown the crank 32 may be used to reciprocate the live electrode 25, and thus prevent the forming of conductor paths in the dielectric emulsion between the live and grounded electrodes. The globules of water pass downward along the upper face of the grounded electrode 18 and are delivered to the body 13 through the return tube 23. As the emulsion is freed of water, it gradually passes outward and upward from the electric field between the electrodes. The oil being separated from the trapped water particles is lightened and will therefore flow to the upper end of the tank 11, being carried therefrom through the pipe 42. Emulsion as it comes from the well contains gas which may be freed therefrom while the emulsion is in the lower end of the tank 11 below the grounded electrode 18. This gas may pass to the upper part of the tank 11 through the gas passages 21 which are formed in the grounded electrode 18. This prevents the forming of bodies of gas in the tank 11 below the electrode 18.

The design of the apparatus shown is one important feature of the invention. The grounded electrode 18 is so formed that all of the water globules will be returned to the body of washing medium 13.

I claim as my invention:

1. A dehydrator comprising: a treating tank; a body of washing medium at the lower part of said tank; means for introducing emulsion into said body of washing medium; a grounded electrode mounted in said tank above said body of washing medium; a live electrode supported in said tank above said grounded electrode, said live electrode being insulated from said tank; means for returning the matter separated from the oil of said emulsion directly to said body of washing medium; and means for withdrawing treated oil from said treating tank.

2. A dehydrator comprising: a treating tank; a body of washing medium at the lower part of said tank; means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member; a live electrode supported in said tank above said grounded electrode, said live electrode being insulated from said tank; means for returning the matter separated from the oil of said emulsion directly to said body of washing medium; and means for withdrawing treated oil from said treating tank.

3. A dehydrator comprising: a treating tank; a body of washing medium at the lower part of said tank; means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member; a live electrode supported in said tank above said grounded electrode, said live electrode being insulated from said tank; a conduit extended downward from said grounded electrode into said body of washing medium for returning the matter separated from the oil of said emulsion directly to said body of washing medium; and means for withdrawing treated oil from said treating tank.

4. A dehydrator comprising: a treating tank; a body of washing medium at the lower part of said tank; means for heating said body of washing medium; means for introducing emulsion into said body of washing medium; a grounded electrode mounted in said tank above said body of washing medium; a live electrode supported in said tank above said grounded electrode, said live electrode being insulated from said tank; means for returning the matter separated from the oil of said emulsion directly to said body of washing medium at a point below said heating means; and means for withdrawing treated oil from said treating tank.

5. A dehydrator comprising: a treating tank; a body of washing medium at the lower part of said tank; means for heating said body of washing medium; means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member; a live electrode supported in said tank above said grounded electrode, said live electrode being insulated from said tank; means for returning the matter separated from the oil of said emulsion directly to said body of washing medium at a point below said heating means; and means for withdrawing treated oil from said treating tank.

6. A dehydrator comprising: a treating tank; a body of washing medium at the lower part of said tank; means for heating said body of washing medium; inlet means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member; a live electrode supported in said tank above said grounded electrode, said live electrode being insulated from said tank; a conduit extended downward from said grounded electrode into said body of washing medium for returning the matter separated from the oil of said emulsion to said body of washing medium, said conduit extending below said heating means and said emulsion inlet; and means for withdrawing treated oil from said treating tank.

7. A dehydrator comprising: a treating tank; a body of washing medium at the lower part of said tank; an emulsion inlet pipe having spray openings for introducing emulsion into said body of washing medium; a grounded electrode mounted in said tank above said body of washing medium; a live electrode supported in said tank above said grounded electrode, said live electrode being insulated from said tank; means for returning the matter separated from the oil of said emulsion directly to said body of washing medium; and means for withdrawing treated oil from said treating tank.

8. A dehydrator comprising: a treating tank; a body of washing medium at the lower part of said tank; means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member and there being gas passages formed in said frusto-conical member; a live electrode supported in said tank above said grounded electrode, said live electrode being insulated from said tank; means for returning the matter separated from the oil of said emulsion to said body of washing medium; and means for withdrawing treated oil from said treating tank.

9. A dehydrator comprising: a treating tank; a body of washing medium at the lower part of said tank; means for introducing emulsion into said body of washing medium; a grounded electrode mounted in said tank above said body of washing medium, said grounded electrode being in the form of an inverted frusto-conical member having tight contact with said tank, there being emulsion passages formed near the center of said frusto-conical member; a live electrode supported in said tank above said grounded electrode, said live electrode comprising concentric rings extending toward said grounded electrode; means for returning the matter separated from the oil of said emulsion directly to said body of washing medium; and means for withdrawing treated oil from said treating tank.

10. A dehydrator comprising: a treating tank; a body of washing medium at the lower part of said tank; means for introducing emulsion into said body of washing medium; a grounded electrode mounted in said tank above said body of washing medium; a live electrode supported in said tank above said grounded electrode, said live electrode being insulated from said tank; a circulation means for assisting the movement of said emulsion into a treating space formed by said electrodes; walls forming a return passage for returning the matter separated from the oil of said emulsion directly to said body of washing medium; and means for withdrawing treated oil from said treating tank.

11. In a dehydrator, the combination of: walls forming a treating chamber and a settling chamber therebelow, said settling chamber containing a body of washing medium; means for establishing an electric field in a treating space of said treating chamber; means for washing the emulsion to be treated in said body of washing medium prior to its passage through said electric field; and means communicating with said treating space for conducting a portion of the treated emulsion downward to a point below the surface of said washing medium.

12. In a dehydrator, the combination of: walls forming a treating chamber and a settling chamber therebelow, said settling chamber containing a body of washing medium; supply means for supplying emulsion to said treating chamber; means in said treating chamber for breaking said emulsion into its constituent phases; and means communicating with said treating chamber and conducting at least a portion of the heavier of said phases downward to a point below the surface of said washing medium, said last-named means communicating with said supply means only through said treating space.

13. In a dehydrator, the combination of: walls forming a treating space and a settling chamber therebelow, said space and said chamber being in communication; a pipe communicating with said treating space and extending downward in said settling chamber to a point below the surface of a body of washing medium therein; and emulsion inlet means for introducing the emulsion to be treated into said body of washing medium.

14. In a dehydrator, the combination of: walls forming a treating space and a settling chamber therebelow, said space and said chamber being in communication; a pipe communicating with said treating space and extending downward in said settling chamber to a point below the surface of a body of washing medium therein; emulsion inlet means for introducing the emulsion to be treated into said body of washing medium; and a heating coil surrounding said pipe to assist the circulation of said emulsion.

15. A combination as defined in claim 14 in which said pipe extends below said emulsion inlet means, and in which said heating coil is positioned between the outlet of said pipe and said emulsion inlet means.

16. In a dehydrator, the combination of: a tank; an interstitial wall extending across said tank and providing an opening in a portion thereof; a return pipe extending downward from said interstitial wall and communicating with said opening; and means for introducing the fluid to be treated into the space between said pipe and said tank, said fluid rising through the interstices of said wall.

17. In a dehydrator, the combination of: a tank; means for setting up a circulation in said tank which is upward immediately inside said tank and downward in the central part of said tank, said means including an annular emulsion introduction means in the outer part of said tank and discharging emulsion upward to set up said circulation; means for establishing an electric field in said tank above said emulsion introduction means and through which said emulsion circulates, said electric field agglomerating the dispersed phase of said emulsion whereby said agglomerated phase settles to the lower end of said tank and the continuous phase rises to the upper end of said tank; means for withdrawing said phases respectively from said ends of said tank; and thermal means heating the incoming emulsion for aiding said circulation.

18. A combination as defined in claim 17 in which said tank contains a body of washing medium in the lower end thereof and in which said emulsion introduction means is submerged.

19. In a dehydrator, the combination of: a tank; a downward sloping wall extending substantially across said tank and defining a settling chamber in the lower end thereof, said settling chamber containing a washing medium; electrode means defining a treating space above said sloping wall in which an electric field is established, said electric field agglomerating the heavier phase of an emulsion therein; and fluid washing means communicating with the lowest portion of the space above said sloping wall whereby said agglomerated phase drains thereinto, said fluid washing means extending into said body of washing medium and discharging said agglomerated phase thereinto.

20. In combination in an electric dehydrator: a tank containing a liquid; a conduit extending vertically in said tank, the interior of said conduit communicating at its upper and lower ends with said liquid; heating means around said conduit for heating said liquid and setting up a closed circulation which is upward around said conduit and downward therethrough; and means for establishing an electric field in said tank through which said liquid thus circulated by said heating means passes.

In testimony whereof, I have hereunto set my hand at Los Angeles, California, this 30th day of July, 1926.

HAROLD C. EDDY.